J. W. TAYLOR.
Cultivator.
No. { 412, 31,416. }
2 Sheets—Sheet 2.
Patented Feb. 12, 1861.
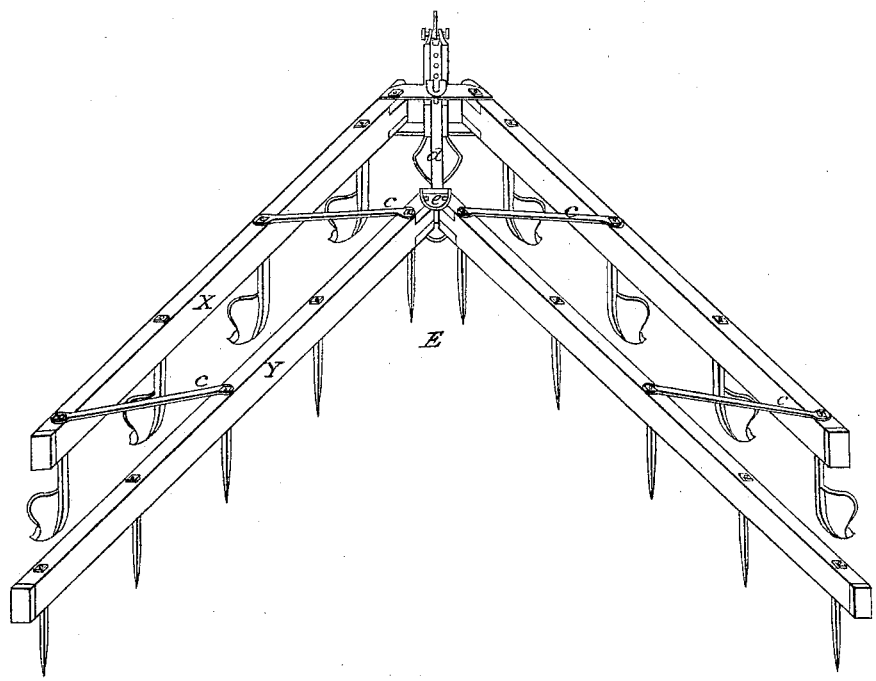
Witnesses:
Inventor:

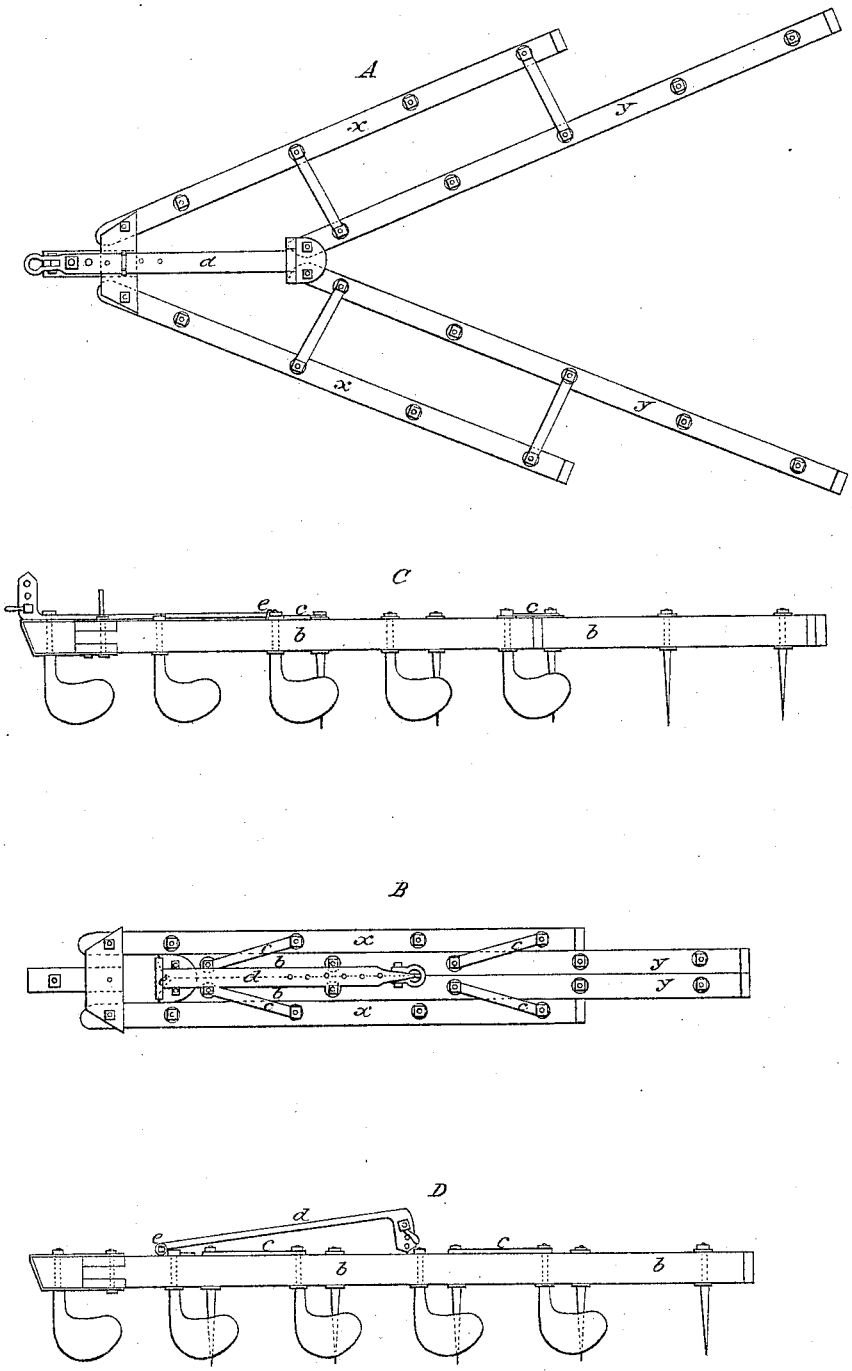

UNITED STATES PATENT OFFICE.

J. W. TAYLOR, OF ASHLAND, VIRGINIA.

IMPROVEMENT IN CULTIVATORS.

Specification forming part of Letters Patent No. 31,416, dated February 12, 1861.

*To all whom it may concern:*

Be it known that I, J. W. TAYLOR, of the county of Hanover, in the State of Virginia, have invented a new and improved harrow for turning in and covering wheat after it has been broadcast, and for breaking the clod or cutting down the ridges; and I do hereby declare that the following is a full and exact description thereof, reference being had to the accompanying drawing, and to the letters of reference marked thereon.

The nature of my invention consists in making a harrow that can be opened and closed at pleasure, and that can be set to any width of furrow required by the farmer, as herein set forth.

By reference to the drawing marked A the shape and form of the harrow may be seen as open and ready for use. The several beams, of wood, (marked X Y,) which hold the blades and teeth, are kept at regular distances from each other by means of parallel iron movable stays, (marked c,) the whole being governed and kept stationary by means of the iron draw-bar, (marked d.)

The width of the harrow is changed at pleasure by moving the pin or wrench from one hole in the draw-bar to another. The harrow is closed up entirely, for convenient transportation, by turning back the draw-bar, which is hinged at e, all of which is shown in the drawing marked B.

The drawing marked C shows a side view of the harrow when open, and the drawing marked D shows a side view of the harrow when closed, and the drawing marked E shows the whole machine in perspective.

X represents a cultivator-frame, and Y a harrow-frame, both of which are constructed in the usual manner.

What I claim as my invention, and desire to secure by Letters Patent, is—

The arrangement of the parallel stays c, draw-bar d, with its hinge e, cultivator-frame X, and harrow-frame Y, the whole being constructed as and for the purposes described.

J. W. TAYLOR.

Witnesses:
CHRISTAIN H. TAYLOR,
WILBUR F. DAVIS.